United States Patent [19]

Shampine

[11] Patent Number: 5,301,791
[45] Date of Patent: Apr. 12, 1994

[54] VIBRATORY PILE CONVEYOR SYSTEM

[75] Inventor: William J. Shampine, Baldwinsville, N.Y.

[73] Assignee: Lipe-Rollway Automation Equipment Div. of Lipe-Rollway Corp., Syracuse, N.Y.

[21] Appl. No.: 957,109

[22] Filed: Oct. 7, 1992

[51] Int. Cl.$^5$ .............................................. B65G 47/24
[52] U.S. Cl. ................................ 198/391; 198/347.4; 198/771
[58] Field of Search ............... 198/347.1, 347.4, 391, 198/400, 411, 416, 443, 771

[56] References Cited

U.S. PATENT DOCUMENTS

| | | | |
|---|---|---|---|
| 3,326,350 | 6/1967 | Cromer et al. | 198/443 X |
| 3,604,551 | 9/1971 | Fink | 198/347.1 X |
| 3,667,590 | 6/1972 | Mead | 198/771 |
| 3,841,471 | 10/1974 | Mead | 198/383 |
| 3,939,966 | 2/1976 | Szenczy | 198/391 |
| 3,995,733 | 12/1976 | Mead | 198/766 |
| 4,037,710 | 7/1977 | Brutcher | 198/443 |
| 4,079,830 | 3/1978 | Winberg et al. | 198/391 |
| 4,401,207 | 8/1983 | Garvey | 198/347.4 X |
| 4,844,240 | 7/1989 | Hütter et al. | 198/771 X |
| 5,103,962 | 4/1992 | Voss et al. | 198/771 X |

Primary Examiner—James R. Bidwell
Attorney, Agent, or Firm—Wall and Roehrig

[57] ABSTRACT

An improved vibratory pile conveyor system has an input chute with independently controlled pile covered feeder surfaces that directs elongated articles into an accumulator. The accumulator is also composed of independently controlled feeder surfaces covered with directional pile material Elongated articles are randomly circulated within the accumulator in a direction dictated by the pile material until the articles are transferred onto a pile-covered delivery feeder surface. An endless belt conveyor driven by a variable speed drive motor is positioned at the output end of the delivery feeder surface. The endless belt conveyor is rotated at a speed so that as the elongated articles leave the delivery feeder surface and enter onto a loading station section of the belt, their longitudinal axes are automatically positioned parallel to the direction of travel of the belt conveyor. Optical scanners are provided for detecting the flow rate of articles passing through the accumulator and delivery feeder surface so that an even flow of articles onto the belt can be maintained. The elongated articles are then transferred on the belt to a discharge station provided with a safety bar for further aiding in the end-to-end alignment of the articles before the articles enter a work station area being uniformly aligned and oriented. After undergoing any number of operations performed at the work station area, the uniformly aligned and oriented articles are then transferred to another area for further processing or handling.

19 Claims, 3 Drawing Sheets

VIBRATORY PILE CONVEYOR SYSTEM

FIELD OF INVENTION

The system of the present invention relates generally to vibratory pile conveyor systems and, more particularly, to an improved conveyor system for delivering elongated articles in a desired uniform orientation to a work station area.

DISCUSSION OF THE PRIOR ART

The assignee of the present application is also the assignee of U.S. Pat. Nos. 3,995,733, 3,841,471 and 4,037,710. The disclosures provided therein are incorporated herein by reference.

The prior art systems disclosed in these patents include the typical vibratory pile conveyor element which includes a feeder surface or trough having a pile material on its surface. The material includes resilient fibers inclined by about 5 to 25 degrees in the direction of motion of objects or articles to be moved along the feeder surface. Movement of the articles or objects is accomplished by vibrators connected to the feeder surfaces by flexible arms.

These systems have been used in various industries for moving any variety of manufactured articles through a production or process system. The system disclosed in U.S. Pat. No. 3,995,733 is directed to a trough-shaped element lined with pile material but does not include an accumulation element for controlling the build up, and directing the flow, of articles passing through the system. The disclosure is thus limited to a straight line transfer element.

The feeder and orienter disclosed in U.S. Pat. No. 3,841,471 provides larger feeder surface areas for accommodating bulk quantities of articles dropped from a supply bin. This system provides for the recycling of objects not properly aligned upon discharge. The system disclosed in this patent is limited to two feeder surfaces and provides additional processing elements for articles exiting the feeder surface areas.

U.S. Pat. No. 4,037,710 discloses an accumulator for an object feeder of the vibratory type covered with pile material. The preferred embodiment disclosed therein includes an accumulator composed of a vibratory pile conveyor element positioned along one side of the main feed portion of a object feeder surface. The accumulator recycles articles or objects that were crowded out of the main feed portion for later transfer back onto the object feeder. Additional embodiments of the accumulator having a number of independent feeder surfaces covered with directional pile material are also disclosed. The disclosure is thus limited and is not directed to the alignment and orientation of delivered articles but rather directed to matching input rate to output rate of a system for processing a flow of objects or articles.

OBJECTS AND SUMMARY OF THE INVENTION

It is therefore an object of the present invention to provide an improved vibratory pile conveyor system overcoming the limitations of the prior art.

It is a further object of the present invention to provide an improved conveyor system for the high-speed, rapid processing of a bulk quantity of unordered and disorganized elongated articles so that the articles enter a work station area with a desired uniform orientation.

Still another object of the present invention is to provide an improved vibratory pile conveyor system for the high-speed, rapid processing of a continuous flow of unordered and disorganized articles so that the articles enter a work station area with a desired uniform orientation.

Still another object of the present invention is to provide an improved vibratory pile conveyor system used in association with a high-speed belt conveyor to uniformly orientate elongated articles moving to a work station area.

An additional object of the present invention is to provide an improved conveyor system with a vibratory pile delivery feeder surface for receiving elongated articles from an accumulator and delivering them to a high-speed belt conveyor for uniform orientation and transfer.

These and other objects are attained in accordance with the present invention wherein there is provided an input chute having parallel feeder surfaces The input chute is provided to direct elongated articles into an accumulator also having independent feeder surfaces. The number of feeder surfaces in the accumulator is preferably at least twice that in the input chute. A quantity of elongated articles cycle through the accumulator and are eventually transferred therefrom onto a delivery feeder surface which in turn directs the flow of articles onto a high-speed endless belt conveyor. All of the feeder surfaces are covered with pile material having resilient filaments inclined in the direction of movement of the articles passing thereover, and are independently vibrated by the method of prior art vibrators. As the articles enter the loading station end of the belt conveyor they are automatically oriented with their longitudinal axes parallel to the direction of travel of the endless belt conveyor. Provided at the other end of the belt conveyor is a safety bar that ensures proper alignment of the articles or returns unaligned articles to the accumulator for recycling. The high-speed belt conveyor terminates with a discharge station section being adjacent to a work station area. At this work station area, any number of a variety of operations may be conveniently performed on the uniformly oriented and aligned elongated articles. Such operations would include but not be limited to the encoding or reading of information, labeling, inspecting, testing, and stamping or spraying.

After undergoing the operations performed at the work station area, the articles are then transferred to other areas for further processing or handling. As an illustrative elongated article, the accompanying figures show a bulb having an enlarged head which is transferred out of the work station area by a pair of transfer rails. The present invention is not limited to processing bulbs, however, and is easily adapted to accommodate any variety of elongated articles such as bottles and cans.

BRIEF DESCRIPTION OF THE DRAWINGS

Further objects of the present invention together with additional features contributing thereto and advantages accruing therefrom will be apparent from the following description of the preferred embodiment shown in the drawings wherein.

DETAILED DESCRIPTION

Figure 1:
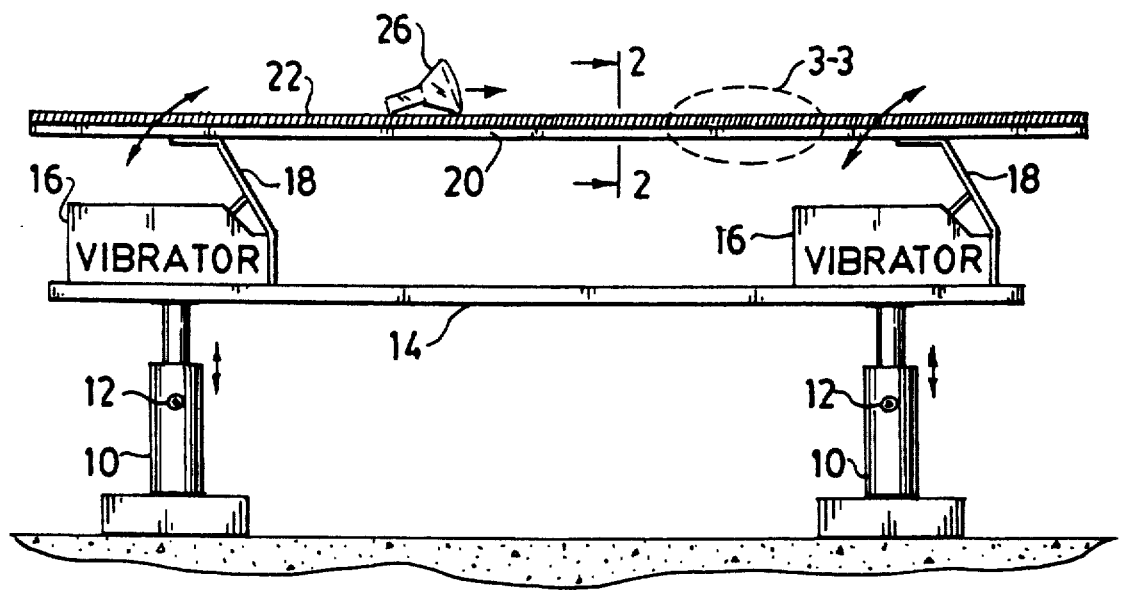
FIG. 1 is a side evaluation section view showing a prior art vibratory pile conveyor element.
Figure 2:
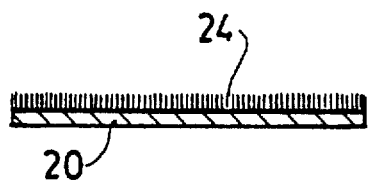
FIG. 2 is a detailed cross-section view taken along lines 2—2 of FIG. 1.
Figure 3:
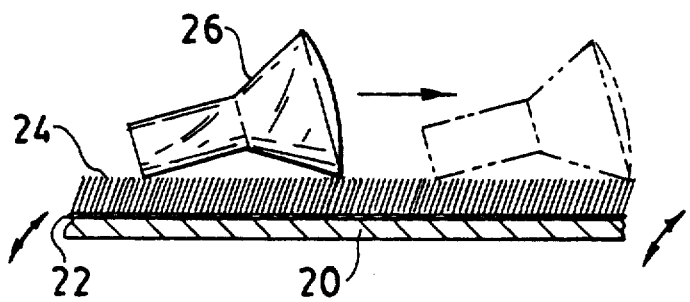
FIG. 3 is a enlarged partial view of the conveyor pile as indicated at 3—3 in FIG. 1.

Referring first to FIGS. 1 through 3 which show a prior art vibratory conveyor element: The typical vibratory conveyor element includes telescopically adjustable legs 10 adjusted by set screws 12. A base 14 is mounted on adjustable legs 10 and has positioned thereon vibrators 16, each vibrator 16 having a flexible vibrator arm 18.

A feeder surface 20 is connected to flexible vibrator arms 18. Feeder surface 20 is covered with pile material 22 which includes resilient filaments 24. The resilient filaments 24 are inclined by about 5 to 25 degrees in the direction of travel of elongated articles 26.

When the vibrators are actuated in the prior art vibratory conveyor, vibrator arms 18 move the feeder surface 20 in a generally reciprocal motion in the direction of inclination of resilient filaments 24. Articles 26 are thereby moved in the direction of inclination of resilient filaments 24 as indicated by the arrows in FIGS. 1 and 3. Pile material 22 including filaments 24 is attached to feeder surface 20 by means of adhesive backed hook tape The hooks on the adhesive backed hook tape attach to a cloth loop backing secured to pile material 22.

The operation of resilient filaments 24 is best shown in FIG. 3. Pile material 22 is vibrated in a motion that is reciprocal in a direction inclined to the horizontal as indicated by the double-headed arrows in FIGS. 1 and 3, so that pile material 22 rises and moves toward the feed direction during one half cycle of vibration and falls and moves away from the feed direction during the other half cycle of vibration. Elongated articles 26 are flexibly supported on the tips of resilient filaments 24, and as the pile material moves upward, filaments 24 are flexed under the weight of articles 26 to bend downward and then urge or spring articles 26 toward the right as viewed in the drawing, to feed them along as the pile material moves downward during the second half cycle of vibration.

The preferred vibratory motion of feeder surface 20 will move articles along the surface even if the surface is not covered by pile material 22, or if covered with a solid material other than pile material 22. Covering feeder surface 20 with pile material 22, however, greatly increases the speed and feeding force of elongated articles 26 along feeder surface 20, and also allows feeder surface 20 to have a much greater length for a given amount of vibrational energy consumed. Pile material 22 is silent when in contact with elongated articles 26 thus reducing objectionable factory noise that would be caused by the bouncing of articles 26 against a solid surface. Pile material 22 also ensures that articles 26 are not marred or damaged while moving along feeder surface 20.

The resilience of resilient filaments 24 is preferably related to the size and mass of articles 26, with greater filament resilience used for lighter objects. One preferred pile material 22 is formed of polypropylene monofilaments 0.012 inches in diameter and three-quarter inch long, angled 20 degrees from the vertical toward the direction of feed. Other materials, however, are satisfactory for the filaments of pile material 22. Many different filament sizes and lengths are usable, and the filaments can be set at different angles from the vertical. The preferred inclination of 5 degrees to 25 degrees from the vertical covers the optimum range for speedy and forceful feeding of elongated articles 26.

The vibration amplitude and frequency of vibrators 16 is adjustable and is selected as a function of the mass and shape of articles 26 and the characteristics of pile material 22. The optimum amplitude and frequency is determined such that articles 26 are supported on the tips of resilient filaments 24 and flex the filaments slightly with each upward half of the vibration cycle to advance articles 26 in the direction of inclination as shown by arrows. The result is a relatively quiet but forceful and fast feeding of articles 26 along feeder surface 20.

Figure 4:
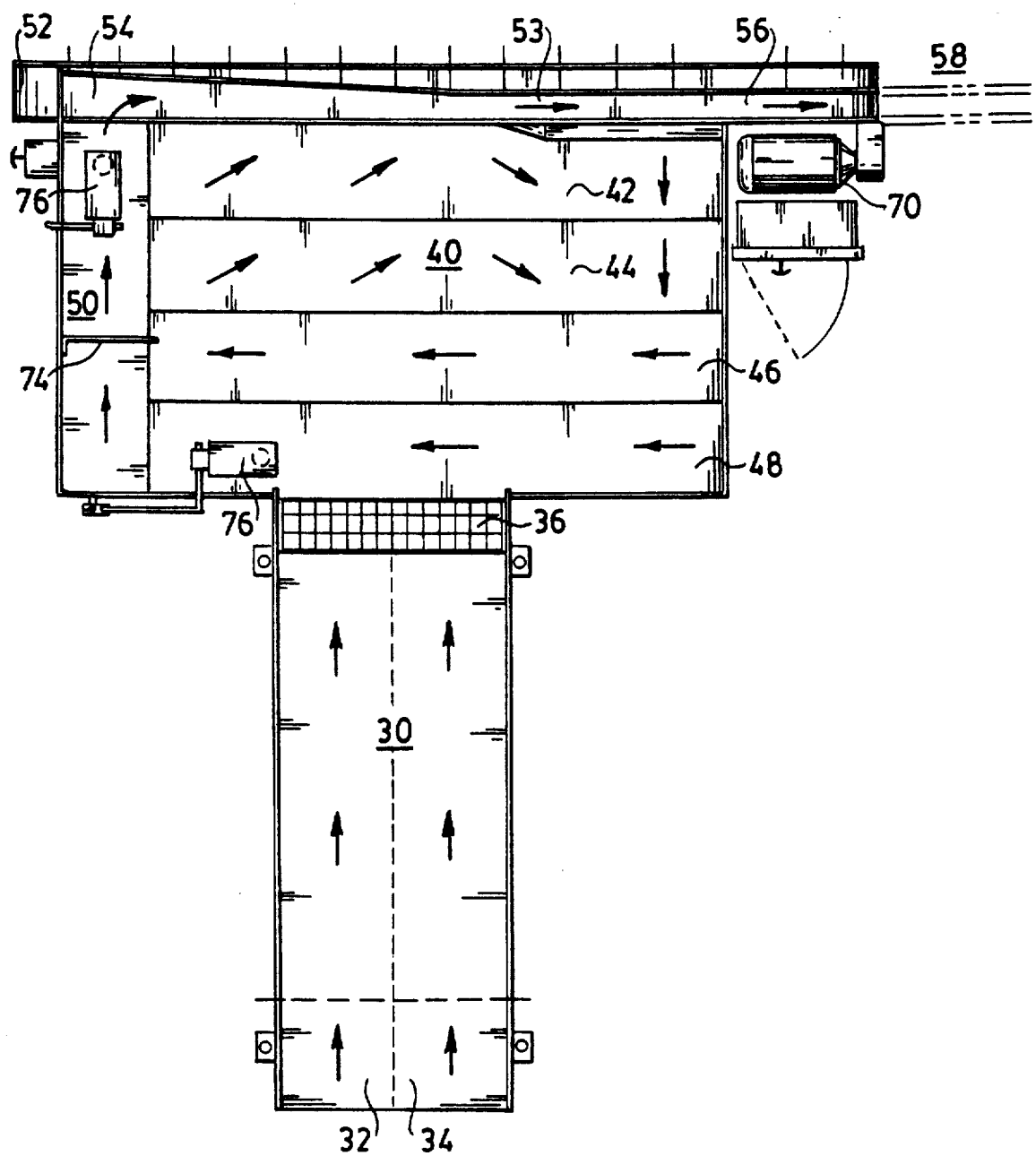
FIG. 4 is a top plan view of the conveyor system according to the present invention.
Figure 5:
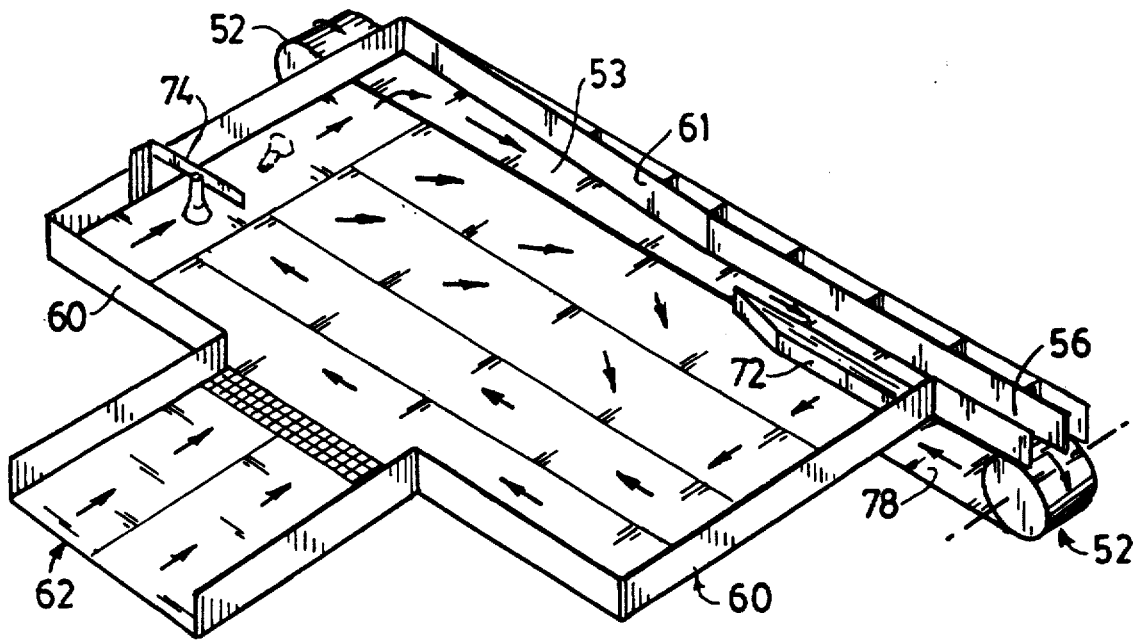
FIG. 5 is a perspective view of the conveyor system according to the present invention.

Referring now to FIG. 4 wherein there is shown the preferred embodiment of the improved system of the present invention. FIG. 4 shows an accumulator 40 including four parallel feeder surfaces 42, 44, 46 and 48. Positioned perpendicular to feeder surface 48 of accumulator 40 is an input chute 30. The input chute 30 has two parallel feeder surfaces 32 and 34. Positioned adjacent to one side of the accumulator 40 is a delivery feeder surface 50. Delivery feeder surface 50 feeds elongated articles 26 onto an endless belt conveyor 52 having an upper run 53 which travels over a linear path of travel from a loading station 54 to a discharge station 56. As shown in FIG. 5, endless belt conveyor 52 also has a lower run 78. Adjacent discharge station 56 is a work station area 58.

In the event the system of the present invention is used for processing breakable articles, a grate 36 may be positioned between input chute 30 and feeder surface 48 of accumulator 40. The holes of grate 36 would be preferably sized smaller than the overall size of elongated articles 26 but large enough to allow any broken pieces to fall therethrough so as not to be delivered into the accumulator 40.

The feeder surfaces 32, 34, 42, 44, 46, 48 and 50 are each covered with pile material 22. Each of the feeder surfaces is thereby provided with resilient filaments 24 inclined by about 5 degrees to 25 degrees in the direction of travel indicated on each surface by the arrows. In this preferred embodiment, each of the feeder surfaces also has positioned thereunder vibrators 16 connected to flexible vibrator arms 18 and may be controlled independently of each other, with respect to vibration amplitude and frequency, by electronic means well known in the art.

A variable speed drive motor 70 is provided to drive the endless belt conveyor 52 along its path of travel from loading station 54 to discharge station 56 at a desired speed. Shown in FIGS. 4 and 5 is a knock-down arm 74 positioned above delivery feeder surface 50. Arm 74 is utilized in this embodiment to place elongated articles 26 into a position such that they lie flat on the feeder surface rather than standing on end before entering loading station 54.

Figure 6:
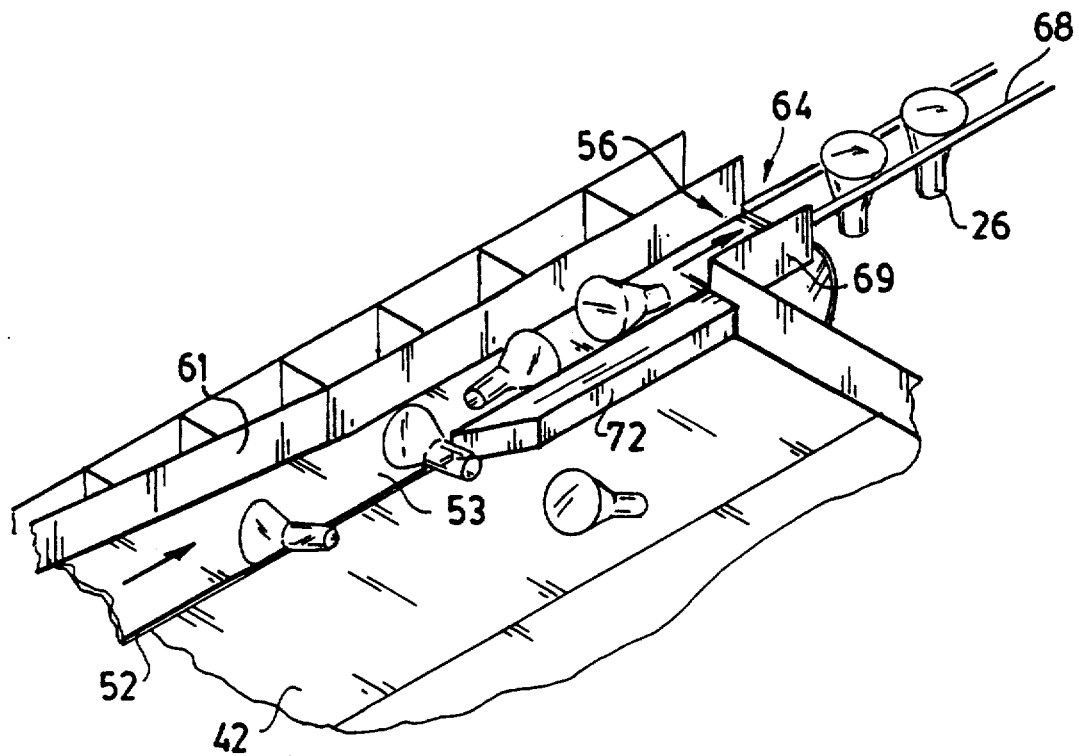
FIG. 6 is an enlarged detailed perspective view of the discharge station portion of the conveyor system according to the present invention.

Shown in FIGS. 5 and 6 is a peripheral wall 60 which is positioned along the boundaries of the feeder surfaces to prevent the articles from falling off of these surfaces. An adjustable retaining wall 61 aids in directing and controlling the flow of elongated articles 26 being transported on the endless belt conveyor 52 and prevents the articles from falling off the far edge of the belt. As shown in greater detail in FIG. 6, a safety bar 72 is positioned between discharge station 56 of endless belt conveyor 52 and feeder surface 42 of accumulator 40 adjacent to the edge of the belt conveyor.

Adjustable retaining wall 61 forms an exit opening 64 with wall section 69 (FIG. 6) to allow elongated articles 26 to exit discharge station 56 and enter work station area 58. As shown in greater detail in FIGS. 5 and 6, adjustable retaining wall 61 situated along the outside edge of endless belt conveyor 52 is not strictly parallel to the edge of the belt but rather gradually runs inwardly toward the safety bar 72. The adjustable retaining wall 61 is adjusted so that the distance between the inside of retaining wall 61 and the safety bar 72 is slightly greater than the width of elongated articles 26. Also shown in FIG. 6 is the feature of the preferred embodiment wherein the surface level of upper run 53 of the endless belt conveyor 52 within discharge station 56 is positioned below the level of feeder surface 42 of accumulator 40. This level difference, in combination with safety bar 72, acts to tip and spin the elongated articles into proper alignment upon entry into discharge station 56.

As mentioned above, the speed of the belt is set at a predetermined velocity depending on the size, shape and weight of the articles being handled. Articles delivered onto the belt at loading station 54 almost immediately orientate themselves on the belt with their longitudinal axis aligned along the direction of belt travel. At times, however, the articles on the belt may bunch up, thus preventing some of the articles from being properly orientated. In the event the articles are not properly aligned end-to-end at the loading station 54, they will be so aligned upon entry into discharge station 56 in the manner described above or be returned to accumulator 40 by safety bar 72. This combination of structural elements ensures that articles 26 are aligned and positioned in the desired orientation. Articles 26 can only pass through discharge station 56 if their longitudinal axes are parallel to the direction of motion.

The present system is designed for accommodating a continuous flow of articles with varying input rates or for batch processing of large bulk quantities of articles periodically placed on input chute 30. During either of these processing modes, the rate of articles moving through the accumulator 40 onto the delivery feed surface 50 can be controlled by varying the speed of vibrators 16 and the endless belt conveyor 52. Optical scanners 76, as shown in FIG. 4, are provided above the end of delivery feeder surface 50 near loading station 54 and above feeder surface 48 of accumulator 40 near the entry onto delivery feeder surface 50. The optical scanners 76 provide an operator of the system with information on the number and rate of articles passing thereunder. In the event clogging occurs in these areas, the speed of the vibrators 16 can be adjusted to even out the flow of circulating articles 26.

As shown in FIG. 6, elongated articles 26 are illustrated in particular by typical spotlight bulbs. To accommodate the shape of these bulbs, a pair of transfer rails 68 is provided. Rails 68 extend from exit opening 64 through work station area 58. As the articles pass through the work station area, uniformly aligned and oriented, any desired operation such as labeling or testing may be performed. The system of the present invention, however, is not limited to the processing of bulbs, but may accommodate any type of elongated article of manufacture. The specific type of transfer means utilized to move articles 26 from the exit opening 64 through work station area 58 will vary depending on the size and shape of articles 26 and may include rails similar to transfer rails 68, another belt conveyor or vibratory pile surface, or any other suitable means.

While the present invention has been explained with reference to the structure of the preferred embodiment disclosed herein, it is not confined to the details set forth. Thus, this application is intended to cover any and all modifications or changes as may come within the scope of the following claims.

What is claimed is:

1. Conveyor apparatus for automatically aligning elongated articles end-to-end for delivery into a work station area comprising:

accumulator means for circulating and recirculating elongated articles each of which has a longitudinal axis;

belt means for transferring and aligning the elongated articles, said belt means being positioned adjacent said accumulator means and arranged to move over a path of travel between a loading station and a discharge station, said discharge station being positioned proximate to the work station area;

delivery means for loading articles from said accumulator means onto said belt means at the loading station; and drive means for moving said belt means along said path of travel at a predetermined velocity such that an elongated article on said belt means automatically aligns its longitudinal axis along the direction of belt travel prior to entering said discharge station.

2. The apparatus according to claim 1 further including an input chute means for directing elongated articles into said accumulator means.

3. The apparatus according to claim 2 further including adjustable retaining wall means adjacent the belt means for confining movement of the elongated articles.

4. The apparatus according to claim 3 further including removal means for transferring articles from the work station area to another station for further handling or processing.

5. The apparatus according to claim 3 further including safety bar means positioned between said discharge station and said accumulator means for returning articles to said accumulator means in the event said articles are not aligned with their longitudinal axes in the direction of travel of said belt means upon entry into said discharge station.

6. The apparatus according to claim 5 wherein said belt means includes a wider end forming the loading station and a narrower end forming the discharge station, the width of the discharge station being such that articles can only pass therethrough with their longitudinal axis aligned parallel to the direction of travel of said belt means.

7. The apparatus according to claim 6 further including means for knocking the articles into a position wherein the longitudinal axis of each article is generally parallel to the surface of said delivery means before the article enters said loading station of said belt means.

8. The apparatus according to claim 7 wherein said accumulator means, delivery means and input chute means include a plurality of feed surfaces, each of said feed surfaces being covered with a pile material having flexible filaments uniformly inclined by about 5 degrees to 25 degrees from the vertical toward the direction of movement of the articles along said feed surfaces.

9. The apparatus according to claim 8 wherein said filaments have uniform length and thickness and a sufficient density so that only the tips of said filaments support the articles to be delivered to said loading station, of said belt means.

10. The apparatus according to claim 9 further including means for vibrating each of said feed surfaces within a range of possible amplitudes and frequencies and, in a generally reciprocal motion in the general direction of the inclination of said filaments whereby said filaments, being sufficiently resilient to flex under the articles during upward movement of said feed surfaces, act to increase the feeding speed and force of said feed surfaces in moving the article toward said belt means.

11. The apparatus according to claim 10 further including optical scanner means positioned above said accumulator means and said delivery means for determining the rate of articles passing thereunder so that the vibrational speed of said feed surfaces may be variably adjusted to even out the flow of circulating elongated articles.

12. An apparatus for receiving a flow of elongated articles, uniformly aligning the articles, and delivering the articles to a work station area, the apparatus including:
- an input chute for receiving the flow of elongated articles having a series of parallel feed surfaces;
- an accumulator for circulating and recirculating the elongated articles, said accumulator having a series of parallel feed surfaces being perpendicular to said input chute feed surfaces so that articles entering said input chute are directed into said accumulator;
- a delivery feed surface being perpendicular to said accumulator feed surfaces and positioned to accept elongated articles, exiting said accumulator.
- an endless belt conveyor positioned at one end of said delivery feed surface to accept elongated articles exiting said delivery feed surface and transfer the articles to the work station area, said endless belt conveyor having a loading end being proximate to said delivery feed surface and a discharge end being proximate to the work station area; and
- a variable drive motor for rotating said endless belt conveyor at a predetermined speed such that as the articles move from the delivery feed surface to the loading end of said endless belt conveyor, the elongated articles are automatically positioned with their longitudinal axes being parallel to the direction of travel of said endless belt conveyor.

13. The apparatus according to claim 12 further including safety bar means positioned between the discharge end of said endless belt conveyor and said accumulator for returning articles to said accumulator in the event the articles are not aligned with their longitudinal axes in the direction of travel of said endless belt conveyor.

14. The apparatus according to claim 13 wherein said endless belt conveyor includes a wider section forming said loading end and a narrower section forming said discharge end, the width of the discharge end being such that articles can only pass therethrough with their longitudinal axes aligned parallel to the direction of travel of said endless belt conveyor.

15. The apparatus according to claim 14 further including a knock-down arm positioned above said delivery feed surface whereby elongated articles in a vertical position passing thereunder are knocked into a position wherein the longitudinal axis of each of said articles is generally parallel to said delivery feed surface before the article enters said loading end of said endless belt conveyor.

16. The apparatus according to claim 15 wherein said feed surfaces are covered with a pile material having flexible filaments uniformly inclined by about 5 degrees to 25 degrees from the vertical toward the direction of movement of the articles along said feed surfaces.

17. The apparatus according to claim 16 wherein said filaments have uniform length and thickness and a sufficient density so that only the tips of said filaments support the articles to be delivered to said endless belt conveyor.

18. The apparatus according to claim 17 further including means for vibrating each of said feed surfaces within a range of possible amplitudes and frequencies and, in a generally reciprocal motion in the general direction of the inclination of said filaments whereby said filaments, being sufficiently resilient to flex under the articles during upward movement of said feed surfaces, act to increase the feeding speed and force of said feed surfaces in moving the articles toward said endless belt means.

19. The apparatus according to claim 18 further including at least two optical scanners, one being positioned above said accumulator and the other being positioned above said delivery feed surface, said at least two optical scanners providing information on the rate of articles passing thereunder so that the vibrational speed of said feed surfaces may be variably adjusted to even out the flow of circulating elongated articles.

* * * * *